United States Patent [19]
Stanley et al.

[11] Patent Number: 5,964,478
[45] Date of Patent: Oct. 12, 1999

[54] ELECTRIC FIELD SENSING AIR BAG DANGER ZONE SENSOR

[75] Inventors: James G. Stanley, Novi; Craig W. White, Grosse Pointe, both of Mich.

[73] Assignee: Automotive Systems Laboratory, Inc, Farmington Hills, Mich.

[21] Appl. No.: 08/911,148

[22] Filed: Aug. 14, 1997

Related U.S. Application Data

[60] Provisional application No. 60/038,620, Mar. 7, 1997.

[51] Int. Cl.⁶ .................................................. B60R 21/32
[52] U.S. Cl. ......................................................... 280/735
[58] Field of Search ............................................. 280/735

[56] References Cited

U.S. PATENT DOCUMENTS

| | | |
|---|---|---|
| 645,576 | 3/1900 | Tesla . |
| 3,672,699 | 6/1972 | De Windt ........................ 280/150 SB |
| 3,740,567 | 6/1973 | Atkins ............................... 307/10 SB |
| 3,767,002 | 10/1973 | Gillund ................................ 180/102 |
| 3,898,472 | 8/1975 | Long .................................. 307/10 SB |
| 4,300,116 | 11/1981 | Stahovec ................................ 340/32 |
| 4,625,329 | 11/1986 | Ishikawa et al. ......................... 382/1 |
| 4,796,013 | 1/1989 | Yasuda et al. ......................... 340/562 |
| 4,831,279 | 5/1989 | Ingraham .............................. 307/116 |
| 4,980,519 | 12/1990 | Mathews ................................. 178/19 |
| 5,071,160 | 12/1991 | White et al. ............................ 280/735 |
| 5,074,583 | 12/1991 | Fujita et al. ............................ 280/735 |
| 5,118,134 | 6/1992 | Mattes et al. ........................... 280/735 |
| 5,161,820 | 11/1992 | Vollmer ................................. 280/730 |
| 5,205,582 | 4/1993 | Shiga et al. ............................ 280/735 |
| 5,214,388 | 5/1993 | Vranish et al. ......................... 324/683 |
| 5,232,243 | 8/1993 | Blackburn et al. ...................... 280/732 |
| 5,247,261 | 9/1993 | Gershenfeld ........................... 324/716 |
| 5,330,226 | 7/1994 | Gentry et al. .......................... 280/735 |
| 5,398,185 | 3/1995 | Omura ............................... 364/424.05 |
| 5,404,128 | 4/1995 | Ogino et al. .......................... 340/425.5 |
| 5,411,289 | 5/1995 | Smith et al. ............................ 280/735 |
| 5,413,378 | 5/1995 | Steffens, Jr. et al. .................... 280/735 |
| 5,439,249 | 8/1995 | Steffens, Jr. et al. .................... 280/735 |
| 5,446,661 | 8/1995 | Gioutsos et al. ..................... 364/424.05 |
| 5,454,591 | 10/1995 | Mazur et al. ........................... 280/735 |
| 5,474,327 | 12/1995 | Schousek ............................... 280/735 |

(List continued on next page.)

OTHER PUBLICATIONS

Reference Data for Engineers:Radio, Electronics, Computer, and Communications, 7th Edition, A.Fong, R.Coakley, J.Dupre, M.Fischer, R.Pratt, D.Rytting pp. 12–1—12–13.

Standard Handbook for Electrical Engineers, Twelfth Edition, D. Fink, H. Beaty pp. 3–56—3–65.

IBM Systems Journal, vol. 35. NOS 3&4, 1996 –Field mice: Extracting hand geometry from electric field measurements, J.R. Smith pp. 587–608.

SAE Technical Paper Series, Occupant Sensing Utilizing Perturbation of Electric Fields, K. Jinno, M. Ofuji, T. Saito, S. Sekido–International Congress & Exposition, Feb. 24–27, 1997, pp. 117–129.

Primary Examiner—Kenneth R. Rice
Attorney, Agent, or Firm—Lyon, P.C.

[57] ABSTRACT

An occupant position sensing system incorporates an electric field sensor (30) into or on the cover (14) of an air bag inflator assembly (12) for purposes of sensing an occupant proximate the air bag inflator so that the air bag inflator may be disabled, or a warning device (26) may be activated, if the occupant is found to be within the associated danger-zone thereof. The electric field sensor (30) may comprise a plurality of electrodes (16), at least one of which is incorporated into or on the cover (14) of the air bag inflator assembly (12), wherein an occupant proximate the sensor electrodes modifies the associated inter-electrode capacitance (50). The output from the electric field sensor (30) may be used to control a controllable air bag inflation system responsive to occupant position. The instant invention provides improved discrimination between animate and inanimate objects, and improved detection of rearward facing infant seats, with reduced likelihood of false position measurements due to occupant extremities or objects proximate the air bag inflator.

45 Claims, 7 Drawing Sheets

U.S. PATENT DOCUMENTS

| | | | |
|---|---|---|---|
| 5,482,314 | 1/1996 | Corrado et al. | 280/735 |
| 5,490,069 | 2/1996 | Gioutsos et al. | 364/424.05 |
| 5,494,311 | 2/1996 | Blackburn et al. | 280/735 |
| 5,515,933 | 5/1996 | Meyer et al. | 180/273 |
| 5,525,843 | 6/1996 | Howing | 307/9.1 |
| 5,528,698 | 6/1996 | Kamei et al. | 382/100 |
| 5,531,472 | 7/1996 | Semchena et al. | 280/735 |
| 5,549,323 | 8/1996 | Davis | 280/728.3 |
| 5,570,903 | 11/1996 | Meister et al. | 280/735 |
| 5,573,269 | 11/1996 | Gentry et al. | 280/735 |
| 5,602,734 | 2/1997 | Kithil | 364/424.055 |
| 5,612,876 | 3/1997 | Zeidler et al. | 364/424.055 |
| 5,618,056 | 4/1997 | Schoos et al. | 280/735 |
| 5,624,132 | 4/1997 | Blackburn et al. | 280/735 |
| 5,626,359 | 5/1997 | Steffens, Jr. et al. | 280/735 |
| 5,653,462 | 8/1997 | Breed et al. | 280/735 |
| 5,722,686 | 3/1998 | Blackburn et al. | 280/735 |

ELECTRIC FIELD SENSING AIR BAG DANGER ZONE SENSOR

CROSS-REFERENCE TO RELATED APPLICATIONS

The instant application claims the benefit of prior U.S. Provisional Application Ser. No. 60/038,620, filed Mar. 7, 1997.

TECHNICAL ART

The instant invention generally relates to occupant position sensing systems for controlling the activation of vehicular safety restraint systems and more particularly for determining the presence and position of an occupant for purposes of influencing the decision of whether or not to deploy a safety restraint system in response to a crash.

BACKGROUND OF THE INVENTION

A vehicle may contain automatic safety restraint actuators that are activated responsive to a vehicle crash for purposes of mitigating occupant injury. Examples of such automatic safety restraint actuators include air bags, seat belt pretensioners, and deployable knee bolsters. One objective of an automatic restraint system is to mitigate occupant injury, thereby not causing more injury with the automatic restraint system than would be caused by the crash had the automatic restraint system not been activated. Generally, it is desirable to only activate automatic safety restraint actuators when needed to mitigate injury because of the expense of replacing the associated components of the safety restraint system, and because of the potential for such activations to harm occupants. This is particularly true of air bag restraint systems, wherein occupants too close to the air bag at the time of deployment—i.e. out-of-position occupants—are vulnerable to injury or death from the deploying air bag even when the associated vehicle crash is relatively mild. Moreover, occupants who are of small stature or with weak constitution, such as children, small adults or people with frail bones are particularly vulnerable to injury induced by the air bag inflator. Furthermore, infants properly secured in a normally positioned rear facing infant seat (RFIS) in proximity to a front seat passenger-side air bag are also vulnerable to injury or death from the deploying air bag because of the close proximity of the infant seat's rear surface to the air bag inflator module.

Air bag inflators are designed with a given restraint capacity, as for example, the capacity to protect an unbelted normally seated fiftieth percentile occupant when subjected to a 30 MPH barrier equivalent crash, which results in associated energy and power levels which can be injurious to out-of-position occupants. While relatively infrequent, cases of injury or death caused by air bag inflators in crashes for which the occupants would have otherwise survived relatively unharmed have provided the impetus to reduce or eliminate the potential for air bag inflators to injure the occupants which they are intended to protect.

One technique for mitigating injury to occupants by the air bag inflator is to reduce the power and energy levels of the associated air bag inflator, for example by reducing the amount of gas generant in the air bag inflator, or the inflation rate thereof. This reduces the risk of harm to occupants by the air bag inflator while simultaneously reducing the restraint capacity of the air bag inflator, which places occupants a greater risk for injury when exposed to higher severity crashes.

Another technique for mitigating injury to occupants by the air bag inflator is to control the rate of inflation rate or the capacity of the inflator responsive to a measure of the severity of the crash. The prior art teaches the use of multi-stage inflators having distinct independent compartmentalized stages and corresponding firing circuits, whereby the stages may be fired in delayed succession to control the effective inflation rate, or stages may be inhibited from firing to control the effective inflator capacity. The prior art also teaches the use of a hybrid inflator having a combination of stored gas and plural pyrotechnic gas generator elements which are independently fired. Furthermore, the prior art also teaches the use of control valves for controlling the gaseous discharge flow from the inflator. The inflation rate and capacity may be controlled responsive to the sensed or estimated severity of the crash, whereby a low severity would require a lower inflation rate or inflation capacity than a high severity crash. Since lower severity crashes are more likely than those of higher severity, and since such a controlled inflator would likely be less aggressive under lower severity crash conditions than those of higher severity, occupants at risk of injury by the air bag inflator because of their size or position will be less likely to be injured overall because they are more likely to be exposed to a less aggressive inflator. However, the risk of injury to such occupants would not be mitigated under the conditions of higher crash severity when the inflator is intentionally made aggressive in order to provide sufficient restraint for normally positioned occupants.

Yet another technique for mitigating injury to occupants by the air bag inflator is to control the activation of the inflator responsive to the presence and position of the occupant, thereby activating the inflator only when an occupant is positioned outside the associated danger-zone of the inflator. Recent NHTSA data suggests that severe injuries due to close proximity with the inflator can be reduced or eliminated if the air bag is disabled when the occupant is closer than approximately 4 to 8 inches from the inflator door. Such a system for disabling the air bag inflator requires a occupant sensor that is sufficiently sensitive and robust to make such a determination, while not causing the air bag inflator to be disabled when otherwise required for providing occupant restraint.

Except for some cases of oblique or side-impact crashes, it is generally desirable to not activate an automatic safety restraint actuator if an associated occupant is not present because of the otherwise unnecessary costs and inconveniences associated with the replacement of a deployed air bag inflation system. The prior art teaches various means for detecting the presence of an occupant, or the recognition of an inanimate object in the passenger-seat of a vehicle for purposes of implementing such a system. For example, weight sensors can incorporated into the seat to detect the presence of an occupant.

Yet another technique for mitigating injury to occupants by the air bag inflator is to control the inflation rate or inflation capacity of the air bag inflator responsive to presence and position of an occupant. Such a control system would most preferentially be used in conjunction with a controllable inflation system responsive to crash severity, such as described above, wherein the occupant position inputs can be used to override otherwise overly aggressive air bag inflator controls which might otherwise be indicated by the particular crash severity level but which could be injurious to occupants of small stature or weight, or to infants in rear facing infant seats. Such a system for controlling the air bag inflator requires an occupant position sensor that is robust and sufficiently accurate, and that can distinguish and discriminate various occupant seating configurations and conditions.

The prior art teaches the use of sensors incorporated into the seat to detect the presence, weight, or seating position of the occupant. U.S. Pat. Nos. 3,672,699, 3,767,002, 5,161,820, 5,474,327, and 5,612,876 teach the use of occupant presence sensors incorporated into the seat to control the activation of the associated air bag inflator. U.S. Pat. No. 5,205,582 teaches a system for which the air bag inflator associated with an unoccupied seat is activated for accelerations above a second crash deceleration threshold, and otherwise deactivated. U.S. Pat. No. 5,074,583 teaches a plurality of sensors incorporated into the seat to detect occupant weight and seating position for purposes of controlling an air bag system. U.S. Pat. Nos. 5,232,243, 5,494,311, and 5,624,132 teaches an array of force sensing film elements incorporated into the seat for purposes of detecting the presence, weight, or position of an occupant for controlling either a multi-stage air bag inflator, an inflator vent valve, or the spatial orientation of the air bag inflator. U.S. Pat. No. 5,404,128 teaches the use of a vibration sensor incorporated into the seat to detect the subtle vibrations caused by the breathing and heart rhythms so as to determine whether or not a person is present. U.S. Pat. No. 5,573,269 teaches a means for correcting a seat weight measurement using seat back inclination angle and foot location. For some systems which incorporate seat weight as means for controlling the activation of an air bag inflator, the air bag inflator is required to be disabled if the sensed occupant weight is less than 30 Kg in order to assure that the air bag inflator is enabled for a fifth percentile female, but disabled for an infant in a rear facing infant seat. In some cases, as for example when the seat belt securing the infant seat is pulled too tight, an associated seat weight sensor could sense an apparent weight greater than the associated cut-off threshold so as to incorrectly enable the air bag inflator when a rear facing infant seat is present.

U.S. Pat. Nos. 5,071,160 and 5,118,134 teach the combination of sensing occupant position and/or velocity, and vehicle acceleration for purposes of controlling an inflator. Both of these patents teach by example the use of ultrasonic ranging to sense occupant position. U.S. Pat. No. 5,071,160 also teaches by example the use of a passive infrared occupant position sensor, while U.S. Pat. No. 5,118,134 teaches the use of a microwave sensor. U.S. Pat. No. 5,398,185 teaches the use of a plurality of occupant position sensors in a system for controlling safety restraint actuators in response thereto.

The prior art teaches the use of one or more ultrasonic beams reflected off the surface of an object to sense the location of the surface of the object. U.S. Pat. No. 5,330,226 teaches the combination of an ultrasonic ranging sensor mounted in the instrument panel and an overhead passive infrared sensor to sense occupant position for controlling a multi-stage air bag inflator or a vent valve connected thereto. U.S. Pat. Nos. 5,413,378, 5,439,249, and 5,626,359 teach the combination of ultrasonic sensor sensors mounted in the dash and seat in combination with other seat sensors to detect the position and weight of the occupant for purposes of controlling an air bag inflator module. U.S. Pat. No. 5,482,314 teaches the combination of ultrasonic and passive infrared sensors together with associated signal processing for purposes of determining whether or not to deactivate a passive restraint system.

The prior art also teaches the use of infrared beams reflected off the surface of an object to sense the location of the surface of the object. U.S. Pat. Nos. 5,446,661, and 5,490,069 teach an infrared beam directed by a transmitter at a point of reflection on the object. A receiver detects the radiation scattered from the point of reflection, and measures the distance of the point of reflection from the transmitter based upon a triangulation of the transmitted and received beams for purposes of controlling the activation of a safety restraint system. These patents also teach the combination of an infrared beam occupant position sensor with an acceleration sensor for purposes of controlling an air bag inflation system. U.S. Pat. No. 5,549,322 teaches the incorporation of a light beam occupant sensor into an air bag door. Furthermore, infrared beam sensors are commonly used as range-finders in automatic focusing cameras.

The prior art of U.S. Pat. Nos. 4,625,329, 5,528,698, and 5,531,472 teach the use of imaging systems to detect occupant position, the later two of which use this information for purposes of controlling an air bag inflator. U.S. Pat. Nos. 5,528,698, 5,454,591, 5,515,933, 5,570,903, and 5,618,056 teach various means of detecting the presence of a rear facing infant seat for purposes of disabling an associated air bag inflator.

The prior art also teaches the use of capacitive sensing to detect the presence, proximity, or position of an occupant. U.S. Pat. No. 3,740,567 teaches the use of electrodes incorporated into the base and back of the seat respectively, together with a capacitance responsive circuit, for purposes of discriminating between human occupants and animals or packages resting on an automobile seat. U.S. Pat. No. 3,898,472 teaches an occupant detection apparatus which includes a metallic electrode which is disposed to cooperate with the body of an automobile to form an occupant sensing capacitor, together with related circuitry which senses variations in the associated capacitance responsive to the presence of an occupant. U.S. Pat. No. 4,300,116 teaches the use of a capacitive sensor to detect people proximate the exterior of a vehicle. U.S. Pat. No. 4,796,013 teaches a capacitive occupancy detector wherein the capacitance is sensed between the base of the seat and the roof of the vehicle. U.S. Pat. No. 4,831,279 teaches a capacity responsive control circuit for detecting transient capacitive changes related to the presence of a person. U.S. Pat. Nos. 4,980,519 and 5,214,388 teach the use of an array of capacitive sensors for detecting the proximity of an object. U.S. Pat. No. 5,247,261 teaches the use of an electric field responsive sensor to measure the position of a point with respect to at least one axis. U.S. Pat. No. 5,411,289 teaches the use of a capacitive sensor incorporated into the back rest of the seat to detect occupant presence. U.S. Pat. No. 5,525,843 teaches the use of electrodes incorporated into the base and back of the seat for purpose of detecting the presence of an occupant, whereby the electrodes are substantially insulated from the vehicle chassis when the detection circuit is active. U.S. Pat. No. 5,602,734 teaches an array of electrodes mounted above the occupant for purposes of sensing occupant position based upon the influence of the occupant on the capacitance amongst the electrodes.

In addition to methods taught by the above referenced U.S. Patents, the prior art also teaches various means of measuring capacitance, as for example given in *the Standard Handbook for Electrical Engineers* $12^{th}$ *edition*, D. G. Fink and H. W. Beaty editors, McGraw Hill, 1987, pp. 3–57 through 3–65 or in Reference Data for Engineers: Radio, Electronics, Computer, and Communications $7^{th}$ edition, E. C. Jordon editor in chief, Howard W. Sams, 1985, pp. 12-3 through 12—12, both included herein by reference.

The technical paper "Field mice: Extracting hand geometry from electric field measurements" by J. R. Smith, published in IBM Systems Journal, Vol. 35, Nos. 3 &4, 1996, pp. 587–608, incorporated herein by reference, describes the concept of Electric Field Sensing as used for making non-contact three-dimensional position measurements, and more particularly for sensing the position of a human hand for purposes of providing three dimensional positional inputs to a computer. What has commonly been referred to as capacitive sensing actually comprises the distinct mechanisms of what the author refers to as "loading mode", "shunt mode", and "transmit mode" which correspond to various possible electric current pathways. In the shunt mode, a voltage oscillating at low frequency is applied to a transmit electrode, and the displacement current induced at a receive electrode is measured with a current amplifier, whereby the displacement current may be modified by the body being sensed. In the "loading mode", the object to be sensed modifies the capacitance of a transmit electrode relative to ground. In the transmit mode, the transmit electrode is put in contact with the user's body, which then becomes a transmitter relative to a receiver, either by direct electrical connection or via capacitive coupling.

In one embodiment, a plurality of capacitive sensors are used to sense distances to the occupant, which in combination with the known locations of the fixed sensor elements are triangulated to locate the position of the occupant. One problem with such capacitive sensor arrangements is that they make use of the dielectric constant of known stability to detect the distance between a sensor and the occupant. Furthermore, the occupant position measurement tends to be associated with the center of mass of the sensed object. However, the sensor can be confused by large metal devices or arms/limbs in close proximity. Therefore, while these sensors may perform satisfactorily as an automatic "on/off" switch to either disable the air bag inflator based upon occupant position, or enable the air bag inflator to be fired responsive to the activation signal from the vehicle crash sensor, the present embodiments of capacitive occupant position sensors may not be sufficiently accurate and robust to provide for controllable inflation based upon occupant position.

Sensors which measure the distance between a point of reference and the surface of an object, such as ultrasonic or infrared beam sensors, are also vulnerable to false measurements, as would be caused for example by the presence of the extremities of an occupant, or by the presence of an object such as a scarf or newspaper held thereby, in proximity to the sensor. These types of sensors could be used to monitor the danger-zone proximate the inflator door, but are subject to several disadvantages. In particular, infrared based systems usually incorporate a beam much narrower than the volume of the danger-zone such that multiple beams may be required to reliably sense an object anywhere inside the danger-zone. The incorporation of multiple beams results in extra cost, complexity, and potentially slowed response. Furthermore, both infrared beam and ultrasonic base sensors would require a significant amount of hardware proximate the inflator door if the danger-zone proximate the inflator is to be monitored.

The main disadvantage of many occupant detection systems is that they do not gather the most relevant information to determine if the occupant is in a danger-zone around the inflator module. Occupant detection systems that are mounted above the passenger and look down on the seat area have the wrong physical perspective to directly monitor the region around the inflator door. Even if an ideal set of roof mounted sensors can reliably determine the occupant's gross position—which is a very challenging task,—the actual volume between the inflator door and the occupant may be blocked to the sensors by the occupant's body. If the criteria for controlling the activation of an air bag inflator were in part based on the proximity of the occupant's body to the air bag inflator door, then overhead sensors simply cannot reliably obtain the relevant information.

SUMMARY OF THE INVENTION

The instant invention overcomes the above-noted problems by providing an occupant position sensing system which incorporates an electric field sensor into or on the cover of the air bag inflator assembly for purposes of sensing an occupant proximate the air bag inflator, and to thereby disable the air bag inflator if the occupant is found to be within the associated danger-zone thereof. The electric field sensor comprises one or more electrodes together with a means for sensing the displacement or conductive currents created therein by the effects of an occupant proximate the sensor, whereby for embodiments with a plurality of electrodes, at least one of these electrodes is incorporated into or on the cover of the air bag inflator assembly, while the remainder of the electrodes may be incorporated in whole or in part also into or on the cover of the air bag inflator assembly, or within the surroundings of the air bag inflator, such as the seat, instrument panel, or sheet metal of the vehicle.

The dielectric and conductive properties of an object proximate the sensor influences the corresponding electric field distribution relative to the sensing electrodes, which in turn affects the resulting displacement or conduction currents in one or more associated electrodes. A detection circuit operatively coupled to a controller transducers the detected current into a measurement of the distance—or a quantity related thereto—of an occupant relative to a point of reference, whereby the controller controls the activation of the air bag inflator in response to the position measurement. If an occupant is positioned within a threshold, which threshold corresponds to the danger-zone of the air bag inflator, then the controller inhibits the deployment of the air bag inflator. Otherwise the air bag inflator is enabled to be activated responsive to the vehicle crash sensor.

In another aspect of the instant invention, the electric field sensor described above comprises a capacitive sensor whereby the object to be sensed influences the capacitance of one or more electrodes constituting the sensor. The measurement of distance between the object and a point of reference is related to the associated capacitance, which measurement is used to control the activation of the air bag inflator.

In yet another aspect of the instant invention, a warning device is incorporated into the vehicle to warn the occupant, either visually or aurally, either that the occupant is positioned within the danger-zone of the air bag inflator, or that the air bag inflator has been disabled because the occupant is so positioned.

In yet another aspect of the instant invention, the measurement of occupant position from the electric field or capacitive sensor described above is used to control the activation of a controllable air bag inflation system, whereby the rate of inflation and the inflator capacity are responsive to occupant position.

Accordingly, one object of the instant invention is to provide an improved occupant position sensing system, which when incorporated into an occupant restraint system reduces the risk of injury to occupants by the air bag inflator.

A further object of the instant invention is to provide an improved occupant position sensing system, which more accurately determines if an occupant is positioned within the danger-zone of the air bag inflator.

A yet further object of the instant invention is to provide an improved occupant position sensing system, which more accurately delineates the danger-zone proximate the air bag inflator.

A yet further object of the instant invention is to provide an improved occupant position sensing system, which warns occupants when they are at risk of injury from the air bag inflator.

A yet further object of the instant invention is to provide an improved occupant position sensing system, with improved detection of rear facing infant seats.

A yet further object of the instant invention is to provide an improved occupant position sensing system, with improved differentiation between animate and inanimate objects.

A yet further object of the instant invention is to provide an improved occupant position sensing system, with improved measurement of occupant position so as to enable improved occupant position dependent control of inflation.

A yet further object of the instant invention is to provide an improved occupant position sensing system, which reduces the likelihood of false position measurements due to occupant extremities or objects proximate the air bag inflator.

In accordance with these objectives, one feature of the instant invention is the incorporation of a position sensor in the cover of the air bag inflator which measures the distance to the object based upon the electric field influencing properties of the object.

Another feature of the instant invention is the incorporation of a controller operatively coupled to position sensor for activating a safety restraint system responsive to the position sensor measurement.

Yet another feature of the instant invention is the incorporation of a control characteristic in the controller for controlling the activation of the safety restraint system responsive to the position sensor measurement.

Yet another feature of the instant invention is the incorporation of an electric field sensor having a plurality of electrodes as the position sensor, for measuring the distance to the object responsive to the electric field influencing properties of the object, which properties include the permittivity, conductivity, size, weight and position of the object.

Yet another feature of the instant invention is the incorporation of a capacitance sensor having a plurality of electrodes as the position sensor, for measuring the distance to the object responsive to the electric field influencing properties of the object which affect the capacitance amongst the electrodes.

Yet another feature of the instant invention is the means to inhibit activation of the associated safety restraint system if the occupant is positioned within a threshold defined within the space of the first and second measurements of distance.

Yet another feature of the instant invention is the activation of a warning device if occupant is positioned within a threshold defined within the space of the first and second measurements of distance.

The specific features of the instant invention provide a number of associated advantages. One advantage of the instant invention with respect to the prior art is an improved determination of whether the occupant is positioned so as to be at risk of injury from the deployment of an air bag inflator so that the air bag inflator may be accordingly controlled so as to reduce the risk of such injuries.

Another advantage of the instant invention is an improved differentiation of animate and inanimate objects for purposes of either deactivating the air bag inflator in the case of an inanimate object, or for preventing the deactivation of the air bag inflator in the case of an occupant either holding an object or placing an extremity, proximate the first position sensor.

Yet another advantage of the instant invention is an improved basis for warning if either an occupant is positioned in the danger-zone proximate the inflator, or if the inflator has been deactivated because the occupant is positioned therein.

Yet another advantage of the instant invention is improved protection for infants in rear facing infant seats for whom the air bag inflator is disabled.

Yet another advantage of the instant invention is that the occupant position sensor may be configured to have a localized sensing volume.

Yet another advantage of the instant invention is that the occupant position sensor is invisible to the occupant within the vehicle since it need not have an unobstructed line-of-site to the occupant to be sensed but instead can be incorporated beneath the external fascia of the cover of the inflator module.

Yet another advantage of the instant invention is that the air bag inflator into which the instant invention is incorporated can be constructed as a single self-contained module incorporating both inflation control and occupant sensing features.

Yet another advantage of the instant invention is an inherently fast occupant position sensing time since the electric field that is sensed thereby can change at the speed of light which means the sensor's dynamic response range is limited only by that of components or algorithms external to the basic sensing element.

Yet another advantage of the instant invention is improved measurement of occupant position so that a controllable inflator may be better controlled responsive to occupant position so as to reduce the risk of injury to an occupant in a vehicle crash.

Accordingly, the instant invention is ideally suited to detecting the presence of an occupant within the 4 to 8 inch danger-zone proximate the air bag inflator for purposes of disabling the air bag inflator or reducing the inflation rate thereof if an occupant is so present.

The instant invention will be more fully understood after reading the following detailed description of the preferred embodiment with reference to the accompanying drawings. While this description will illustrate the application of the instant invention in a frontal air bag restraint system, it will be understood by one with ordinary skill in the art that the instant invention can also be applied to other types of restraint systems, such as for protection from side-impact, rear-impact, or roll-over collisions, such as with air bags, seat belt pretensioners, or deployable knee bolsters.

BRIEF DESCRIPTION OF THE DRAWINGS

FIG. 8 illustrates the operation of the instant invention for a top-mount passenger-side inflator.

DETAILED DESCRIPTION OF THE PREFERRED EMBODIMENT(S)

Figure 1:
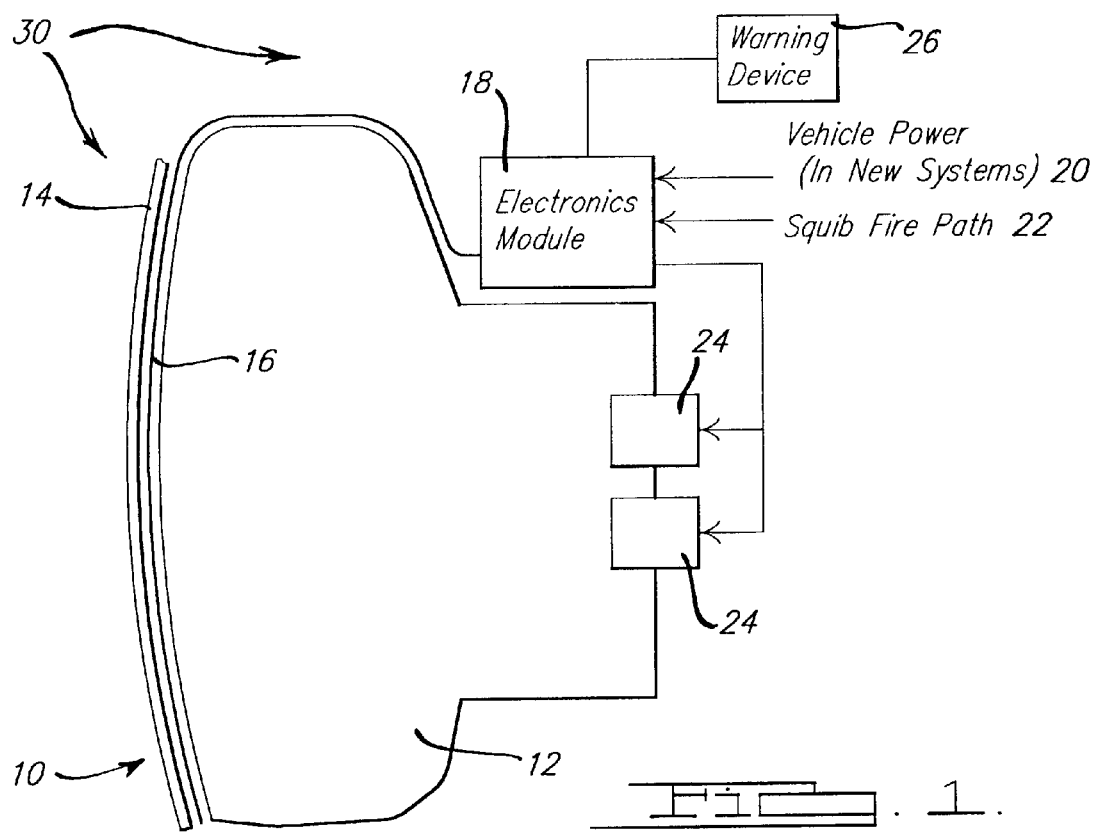
FIG. 1 is a side view of an undeployed inflator module embodying the instant invention.

Referring to FIG. 1, an integrated air bag inflator and electric field sensor assembly 10, referred to hereinafter as a safety restraint system, comprises an air bag and inflator assembly 12 having an air bag inflator module cover door 14 within which is incorporated a sensor electrode assembly 16 constructed from a conductive material, which for example could be either a continuous conductor, a wire mesh or braid, a conductive plastic, or a conductive layer deposited onto a flexible substrate such as by silk screening or some other process. By this construction, the sensor electrode assembly 16 is hidden from the occupant so as to not interfere with the aesthetic appearance of the associated vehicle interior. The sensor electrode assembly 16 could also be placed on either side of the air bag inflator module cover door 14, in which case the sensor electrode assembly 16 would effectively become part of the air bag inflator module cover door 14 in that the sensor electrode assembly 16 would be moved therewith out of the way of the deploying airbag during the deployment of the air bag and inflator assembly. The sensor electrode assembly 16 communicates with an electronics module 18 which is connected to the vehicle power supply 20 and to a inflator firing control signal 22 as would be generated by a crash sensor. Alternately, the associated crash sensor could be incorporated directly into the electronics module 18, thereby eliminating the need for the external firing control signal 22. The electronics module 18 also communicates with one or more squibs, electric primers, or initiators 24, hereinafter referred to as initiators, which activate the associated inflator in response to an electrical signal. The electronics module also communicates with a warning device, 26, for purposes of communicating either a visual or audible warning signal to the occupant in the event of either a malfunction of any of the diagnostically testable components within the safety restraint system 10, in the event that the occupant is positioned proximate the danger-zone thereof, or in the event that the occupant is so positioned and the electronics module 18 has inhibited the activation of the safety restraint system 10.

Figure 2:
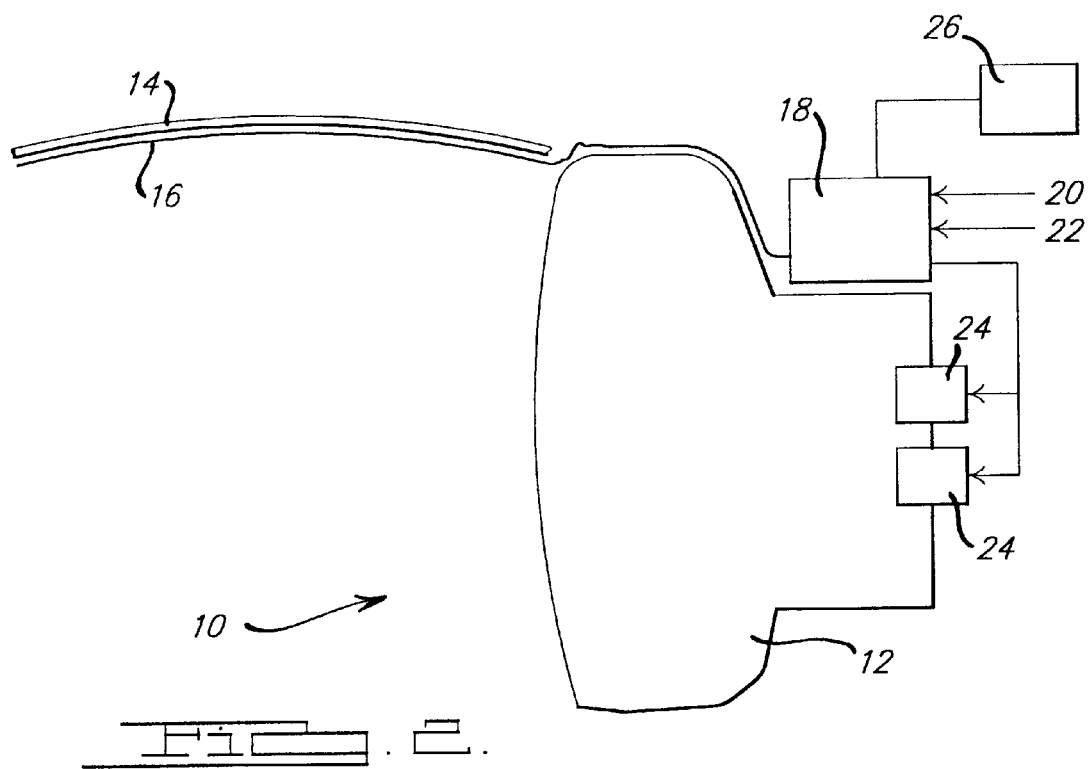
FIG. 2 is a side view of a deployed inflator module embodying the instant invention.

In operation, in response to a crash of sufficient severity to warrant the activation of the safety restraint system 10, a crash sensor generates a firing control signal 22 which is input to the electronics module. In the event that there is no occupant within the danger-zone of the safety restraint system 10, the initiators 24 activate the air bag and inflator assembly 12 causing the air bag to be deployed. FIG. 2 illustrates the configuration of the inflator module cover door after such a deployment. In the event that an occupant is detected within the danger-zone of the safety restraint system 10, the electronics module inhibits the activation of the initiators 24 by the electronics module 18 and activates the warning device 26 if the safety restraint system 10 is so equipped. Alternately, in the event that an occupant is detected within the danger-zone of the safety restraint system 10, the electronics module activates the warning device 26. Alternately, responsive to the occupant position sensed by the occupant sensor 30, comprising the sensor electrode 16 and electronics module 18, the electronics module 18 controls the number of initiators 24 to be fired, and the associated firing times thereof, so as to provide an inflation characteristic that will not injure an out-of-position occupant.

Figure 3:
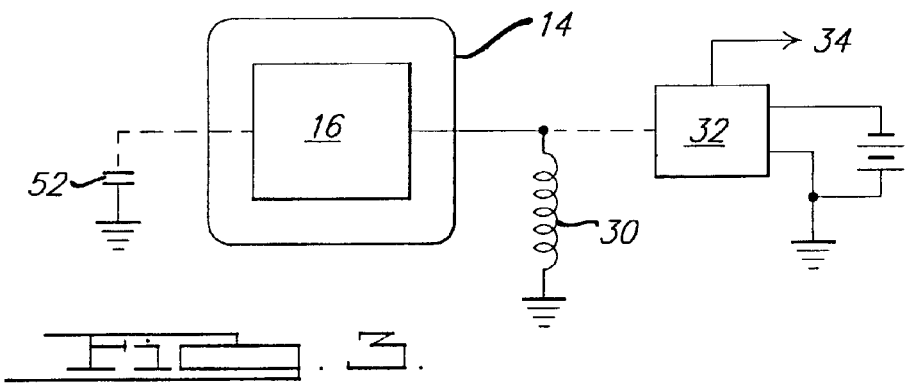
FIG. 3 is a front view of the airbag inflator module door containing a single electrode embodiment of the instant invention.
Figure 4:
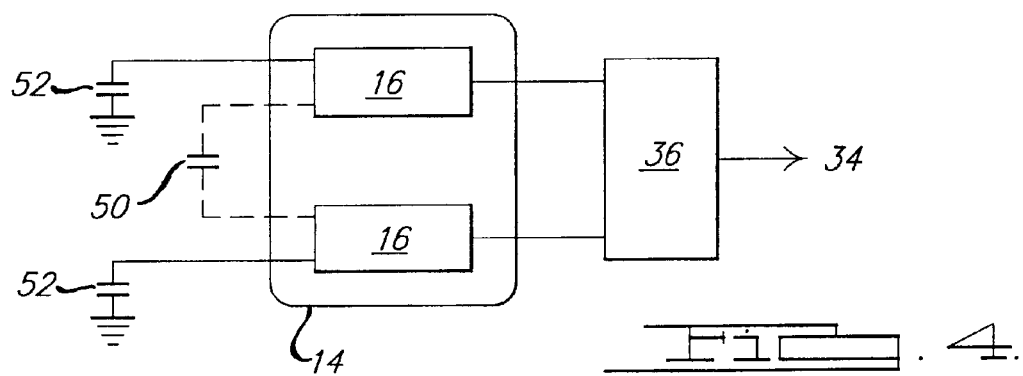
FIG. 4 is a front view of the airbag inflator module door containing a dual electrode embodiment of the instant invention.
Figure 5:
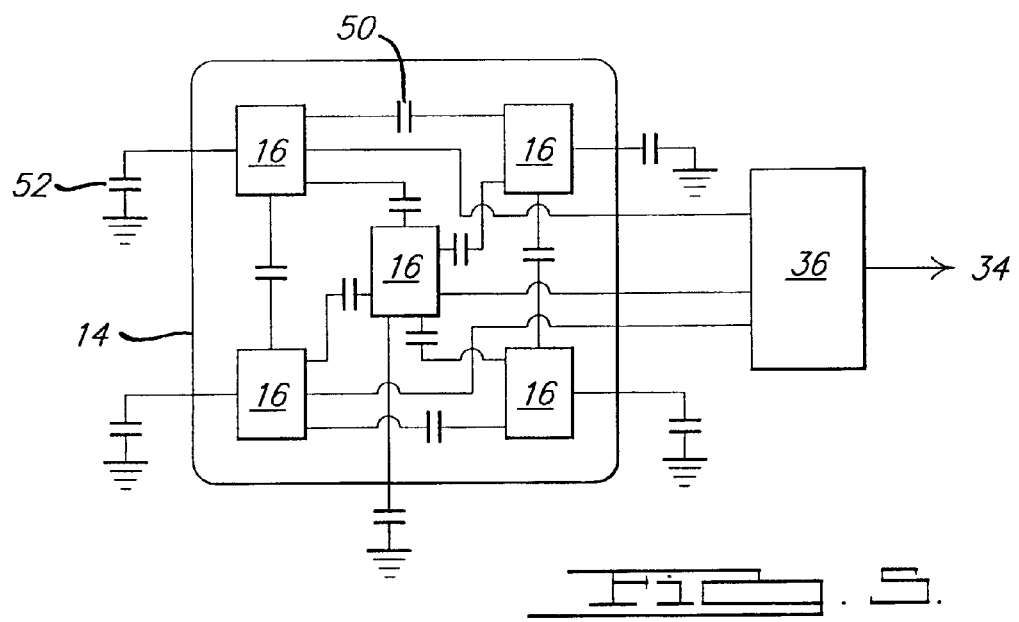
FIG. 5 is a front view of the airbag inflator module door containing a five electrode embodiment of the instant invention.

The instant invention uses an electric field sensing method to determine if any part of the occupant is relatively close to the air bag inflator module cover door 14. This sensing method has also been called "capacitive sensing", and is more generally known in the art as electric field sensing, wherein the presence of a conductive or dielectric object is sensed. The human body has conductive and dielectric properties such that any part of the body in close proximity to the sensor will be detected. If the associated sensor electrode assembly 16 is located on, or very near to, the air bag inflator module cover door 14, the danger-zone of the safety restraint system 10 can be constantly monitored. The response of the sensor can be fast enough to disable the air bag if the occupant enters the danger-zone immediately prior to the impact, which could happen during pre-impact braking. FIGS. 3–5 illustrate various configurations for the sensor electrode assembly 16 within the scope of the instant invention.

In FIG. 3, the sensor electrode assembly 16 comprises a single electrode which exhibits a stray capacitance relative to ground. The capacitance of this sensor electrode assembly 16 is influenced by the proximate presence of either dielectric or conductive objects, and may be detected using circuitry known to those of ordinary skill in the art. For example, in accordance with the devices illustrated in U.S. Pat. No. 645,576 the single electrode sensor electrode assembly 16 may be connected to an inductor 30 to form a series resonant LC circuit, whereby an associated detector circuit 32 either conductively or magnetically linked thereto produces an excitation signal which causes the associated LC circuit of inductor 30 (L) and capacitor 16, 52 (C) to resonate, whereby the resonant frequency is then measured by the associated detector circuit, and communicated to the electronics module 18 as an output signal 34 in units of either frequency, distance, or some other quantity associated with the proximate distance of the object to be sensed.

In FIGS. 4 and 5, the sensor electrode assembly 16 comprises a plurality of electrodes which exhibit both inter-electrode capacitance 50 and individual capacitance 52 relative to ground, whereby the proximate presence of an object influences the value of the associated capacitance in relation to the proximity of the object. The sensor electrode assembly 16 is connected to an associated detector module which senses, using circuitry known to those of ordinary skill in the art, the effect of the inter-electrode capacitance 50 and outputs a signal 34 associated with the proximity of the sensed object to the sensor electrode assembly 16.

One method of performing this type of sensing is to produce a slowly varying electric field with a first, "transmit" electrode and measure the induced displacement current in a second, "receive" electrode. The two electrodes can be configured in such a way that the displacement current is changed when a human body part (or any other conductor or dielectric) is close enough to the electrode pair to interfere with the electric field coupling between the electrodes. The range of the sensor is largely a function of the geometry and size of the electrodes, and the separation between the electrodes.

In general, an electric field can created proximate a single electrode by applying a source of electric potential between the electrode and an associated ground, and an electric field can be created proximate a plurality of electrodes by applying a source of electric potential across the associated electrodes, whereby the source of potential may be either constant or time varying.

Figure 6A:
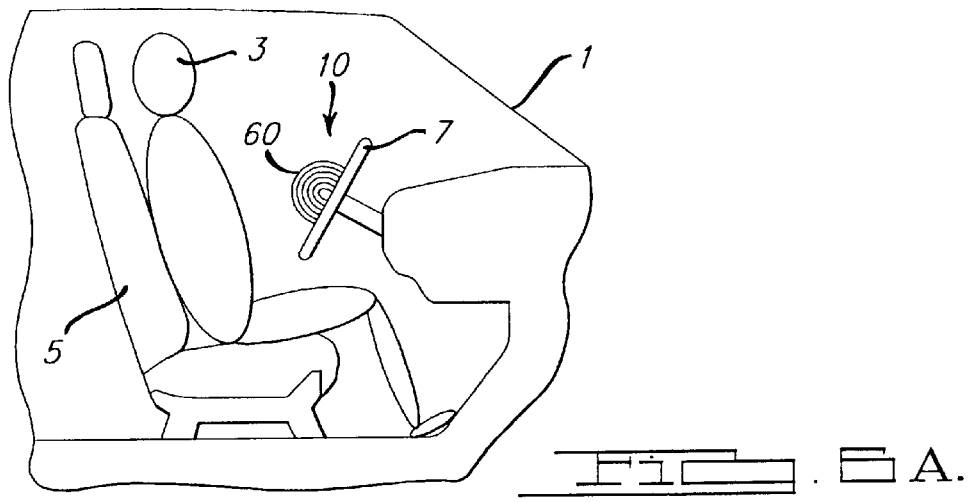
FIG. 6 illustrates the operation of the instant invention for a driver-side inflator.
Figure 6B:
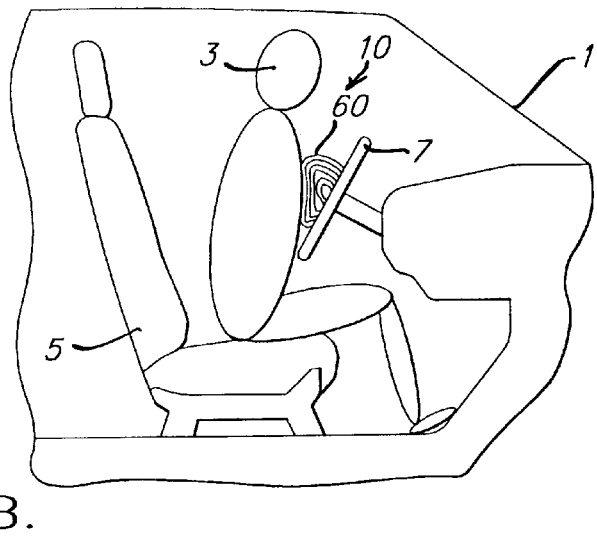
Figure 6C:
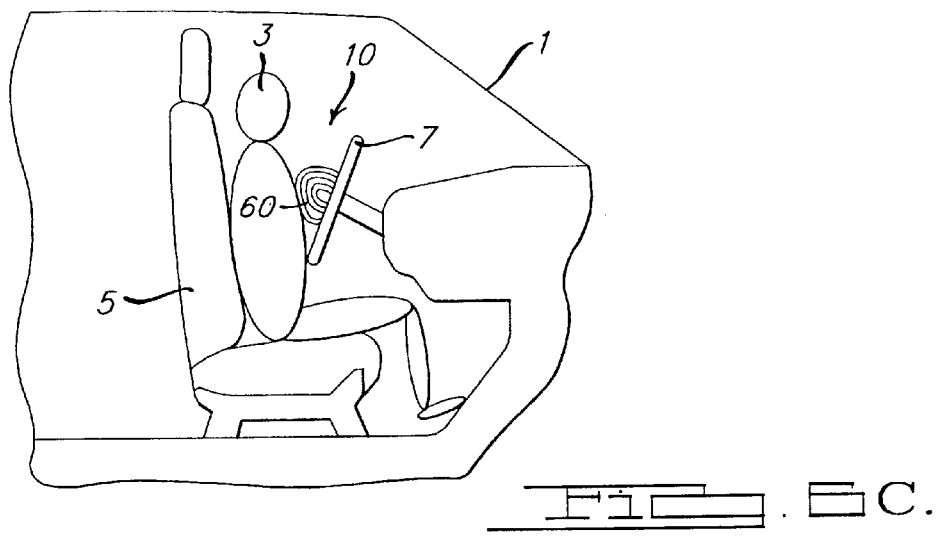
Figure 7A:
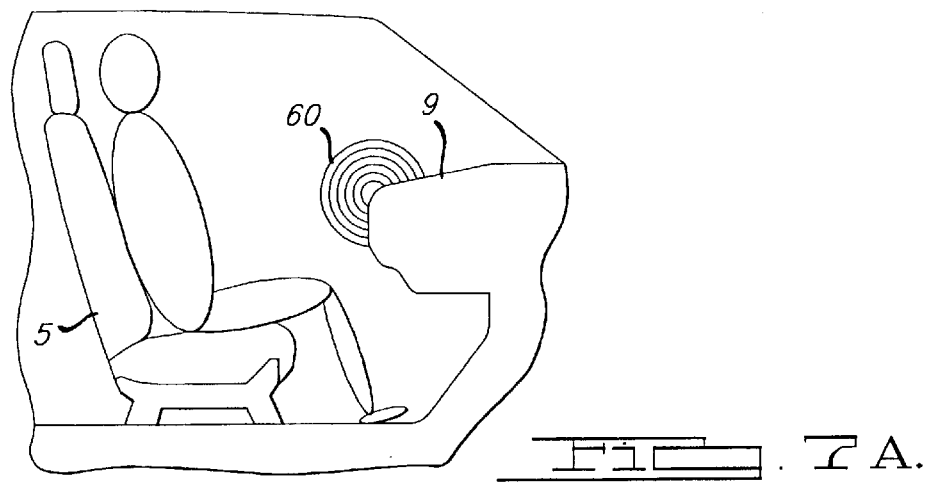
FIG. 7 illustrates the operation of the instant invention for a mid-mount passenger-side inflator.
Figure 7B:
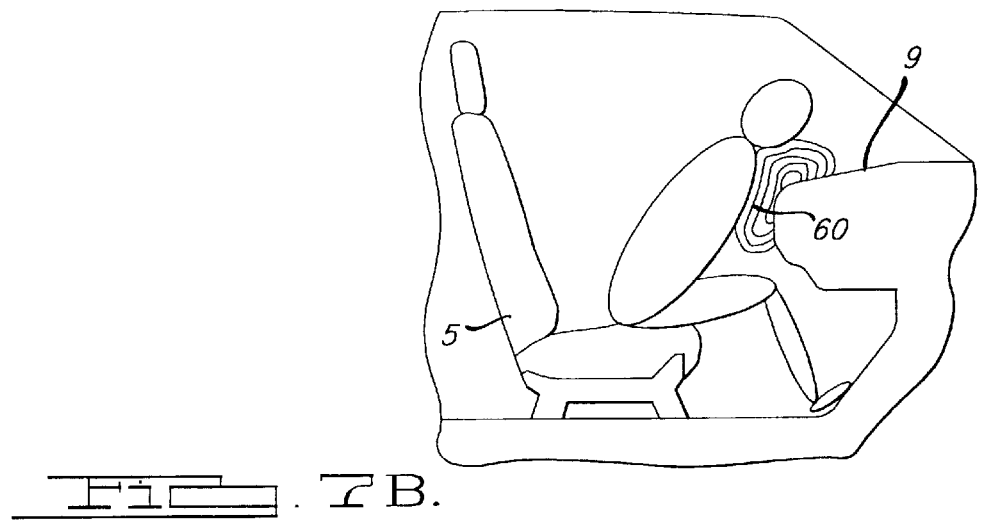
Figure 7C:
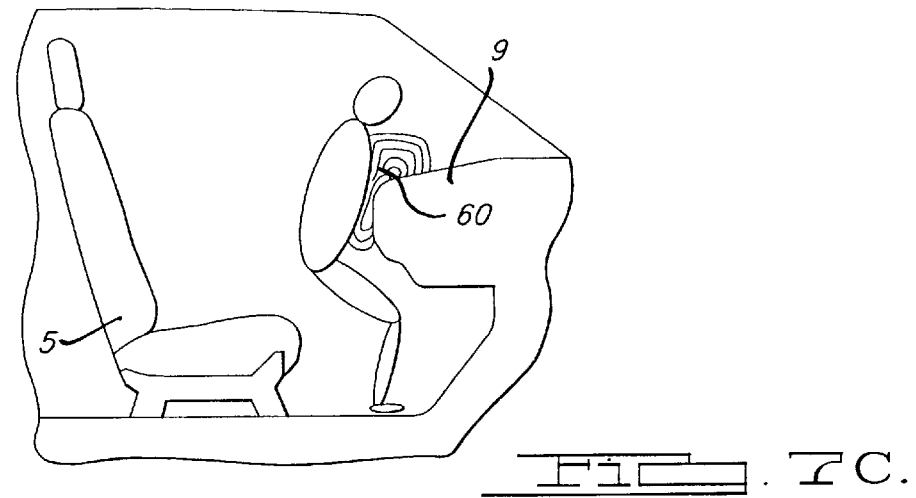
Figure 5A:
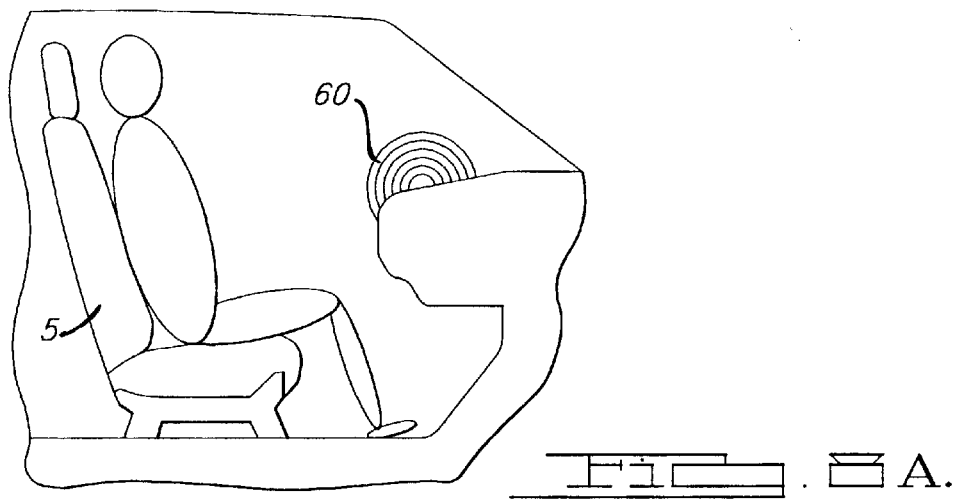
Figure 5B:
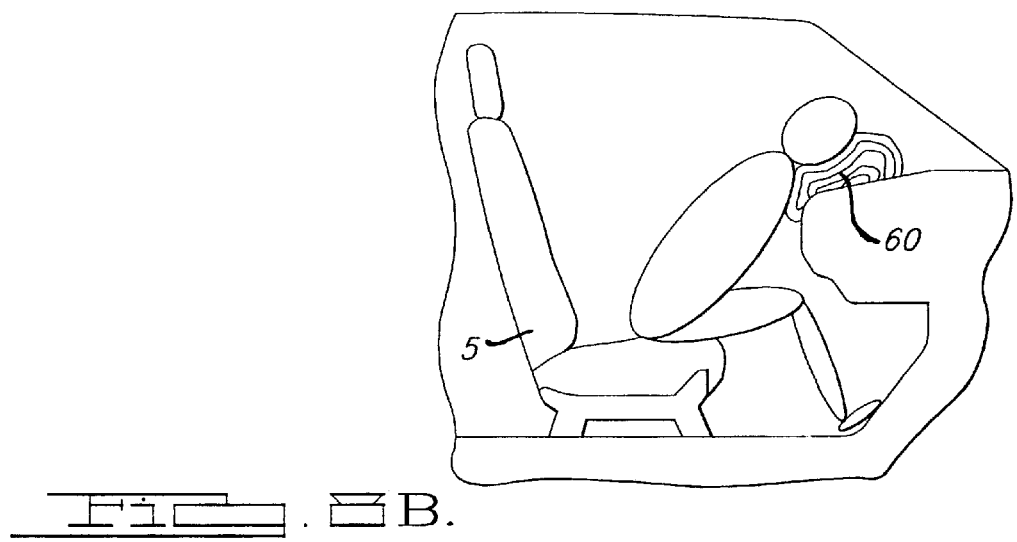
Figure 5C:
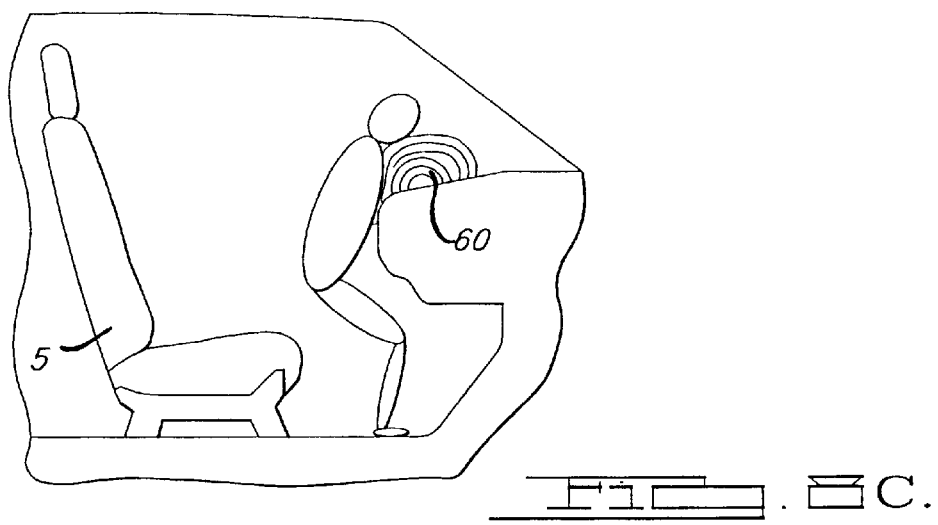

FIGS. 6-8 illustrate the operation of the instant invention for driver-side, mid-mount passenger-side, and top-mount passenger side inflator implementations respectively. The sensing volume 60 associated with the occupant sensor 30 in illustrated for each case. The level of the detected signal corresponding to the danger-zone of the inflator is readily calibrated for a given vehicle by first identifying the physical bounds of the zone, and then placing occupants in various positions proximate the danger-zone to develop an association between the detected signal level and the penetration by the occupant of the danger-zone of the safety restraint system 10. Figure frames a through c illustrate the field sensing operation for various occupants in various seating positions.

Figure 9:
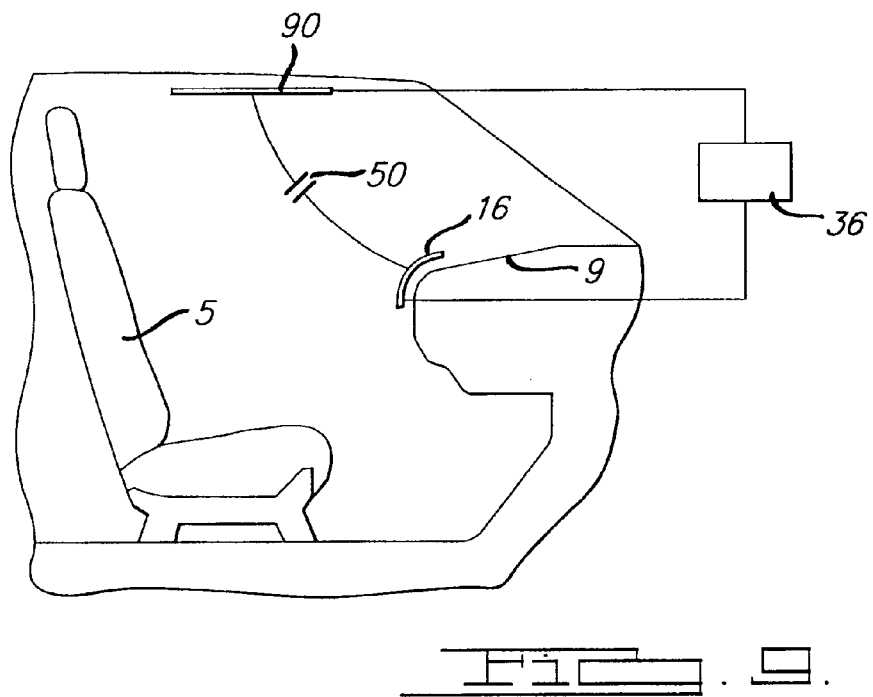
FIG. 9 illustrates an embodiment of the instant invention which incorporates a sensing electrode in the vehicle headliner.
Figure 10:
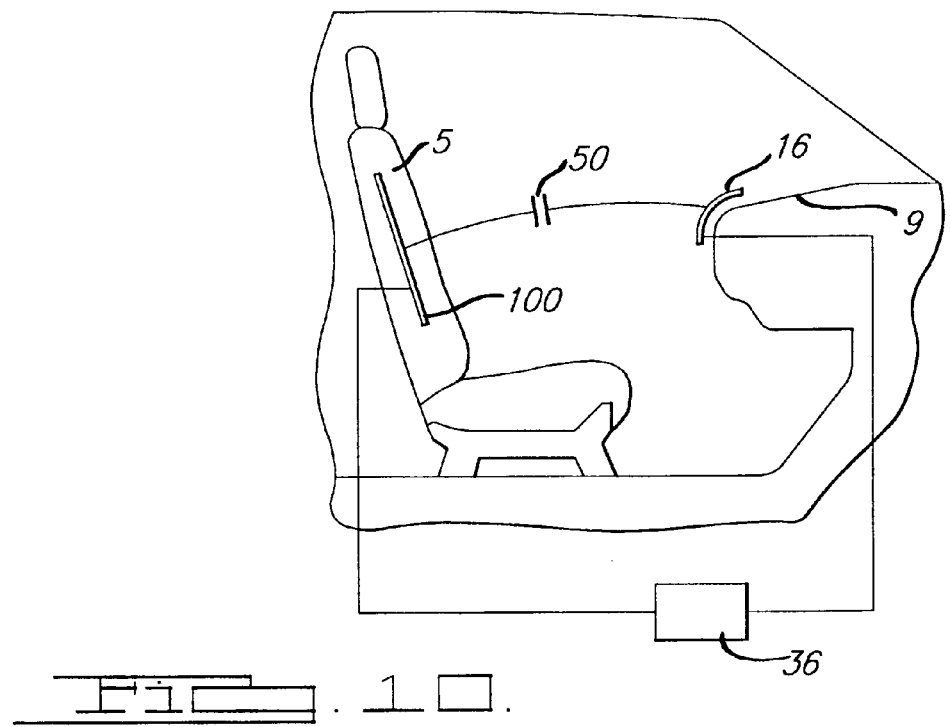
FIG. 10 illustrates an embodiment of the instant invention which incorporates a sensing electrode in the vehicle seat.

FIGS. 9 and 10 illustrate ways of increasing the range of detection for the occupant sensor for purposes, for example, of providing control of the inflator characteristic responsive to the sensed occupant position. In FIG. 9, a second sensor electrode assembly 90 comprising one or more electrodes is placed in the headliner of the passenger compartment, whereby the resulting occupant sensor 30 comprising the first 16 and second 90 sensor electrode assemblies together with an associated detector circuit is sensitive to the presence of an occupant within the volume spanned by the associated sensor electrode assemblies. Similarly, FIG. 10 illustrates the placement of the second electrode assembly 90 in the vehicle seat back. This second electrode assembly 90 could alternately be placed in the seat base without departing from the spirit of the instant invention.

Figure 11:
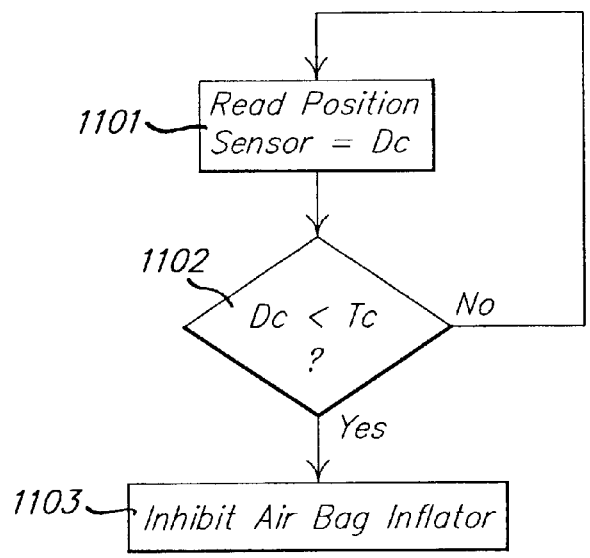
FIG. 11 is a flow chart illustrating the operation of the instant invention as used to disable an air bag inflator when the occupant is in a danger-zone.

Referring to FIG. 11, in step 1101 the electronics module 18 reads the occupant sensor 30 to measure the distance $D_C$ from the electric field influencing properties of the object. If in step 1102 this distance is less that a threshold $T_C$, indicating that the occupant would not be in danger of injury by the safety restraint system 38, then step 1101 is repeated. Otherwise, in step 1103, the electronics module 18 inhibits the activation of the safety restraint system 10.

Figure 12:
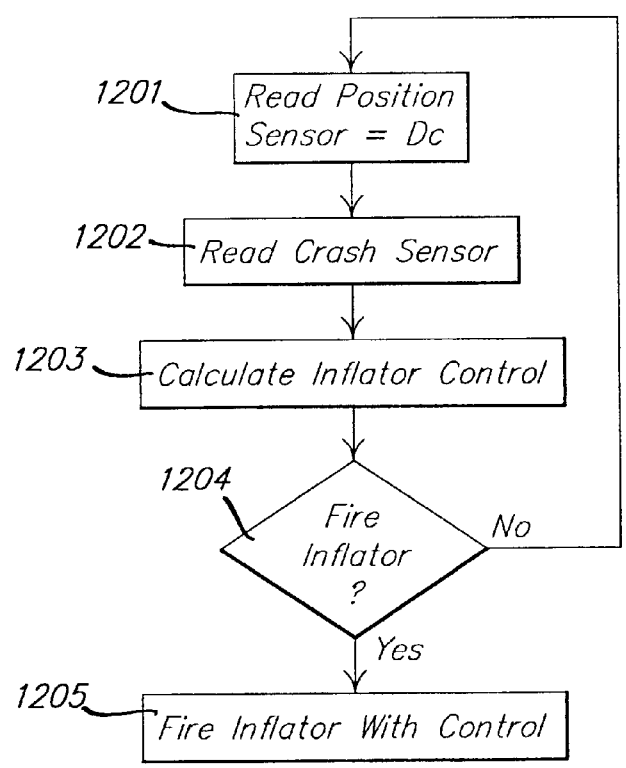
FIG. 12 is a flow chart illustrating the operation the instant invention as used to control the operation of an air bag inflator.

Referring to FIG. 12, in step 1201 the electronics module 18 reads the occupant sensor 30 to measure the distance $D_C$ from the electric field influencing properties of the object. Then in step 1202 the crash sensor is read to determine the severity of the crash, after which the associated inflator firing control characteristic are calculated in step 1203 using the measurements of distance $D_C$ and crash severity. If in step 1204 the resulting inflator firing control characteristic indicates that the inflator should be fired, then the safety restraint system 10 is activated in step 1205 in a controlled fashion according to the control characteristic. Otherwise, step 1201 is repeated.

The instant invention would be useful and beneficial on both the driver and the passenger side. On the driver side, this invention could be especially effective in the situations where the driver is relatively short and sits very close to the steering wheel (and its air bag) in order to reach the pedals. Occupants on both the driver and the passenger side would benefit when they are within the danger-zone at the time of impact. This system could achieve significant safety improvements in cases where the crash sensing algorithm is so inferior that many normally seated occupants are severely out of position because the crash sensor's deployment command was far too late.

The instant invention could be an integral part of any inflator so as to form a stand-alone "smart inflator" which can be used on either or both the driver and the passenger side. Upon a signal from the crash electronic control unit (ECU), the inflator determines whether to fire and/or perform a soft, predetermined inflation based on measured range, as may be embodied in several ways. For example, either a simple on/off strategy may be used, or the inflation rate and capacity may be controlled to provide an inflator that is softer than alternative single stage downloaded inflators. Furthermore, the system may contain a warning device, such as a light or buzzer, integrated into the inflator assembly, which indicates when the deployment of the inflator is inhibited. This warning device could also be considered to be a safety device in that it would teach drivers to keep their arms from resting across the inflator module while driving.

This inflator could be a drop-in replacement for a standard inflator whereby the activation signal from the module would be monitored rather than directly connected to the associated initiator. The associated monitoring electronics would operate on a low amount of test current in order to main compatibility. This system could also be used in new vehicles where a separate power feed for the inflator would simplify the monitoring electronics.

One of ordinary skill in the art will appreciate that the measurement of a physical quantity such as distance or capacitance in the context of the instant invention does not necessary require that the actual distance in units of length, or capacitance in units of farads, be measured in order to practice the instant invention. Instead, the actual sensed quantity could be of different physical units, such as frequency, voltage, or current, whereby the sensed quantity varies in response to actual variations in distance of the object to be sensed.

One of ordinary skill in the art will further appreciate that distances measured by a position sensor may be transformed to corresponding distances relative to any point of reference which position is known relative to the associated position sensor.

While specific embodiments have been described in detail, those with ordinary skill in the art will appreciate that various modifications and alternatives to those details could be developed in light of the overall teachings of the disclosure. Accordingly, the particular arrangements disclosed are meant to be illustrative only and not limiting as to the scope of the invention, which is to be given the full breadth of the appended claims and any and all equivalents thereof.

We claim:

1. An apparatus for controlling the activation of a safety restraint actuator responsive to an object that is subject to restraint by the safety restraint actuator, comprising:
   a position sensor, responsive to the electric field influencing properties of the object, for measuring the distance between a point of reference and the object, wherein said position sensor further comprises at least one electrode incorporated into a distal portion of the safety restraint actuator; and
   a controller operatively coupled to said position sensor for activating the safety restraint actuator, responsive to said measurement of distance.

2. The apparatus for controlling the activation of a safety restraint actuator responsive to an object that is subject to restraint by the safety restraint actuator, as recited in claim 1, wherein said position sensor further comprises:
   a. a means for producing an electric field proximate said electrode; and
   b. a means for sensing the influence of the object on said electric field.

3. The apparatus for controlling the activation of a safety restraint actuator responsive to an object that is subject to restraint by the safety restraint actuator, as recited in claim 2, wherein said controller inhibits the activation of the safety restraint actuator if said measurement of distance is within a threshold.

4. The apparatus for controlling the activation of a safety restraint actuator responsive to an object that is subject to restraint by the safety restraint actuator, as recited in claim 3, further comprising a warning device operatively coupled to said controller so as to indicate when said measurement of distance is within a threshold.

5. The apparatus for controlling the activation of a safety restraint actuator responsive to an object that is subject to restraint by the safety restraint actuator, as recited in claim 1, wherein said position sensor further comprises a means for measuring the capacitance of said electrode.

6. The apparatus for controlling the activation of a safety restraint actuator responsive to an object that is subject to restraint by the safety restraint actuator, as recited in claim 5, wherein said controller inhibits the activation of the safety restraint actuator if said measurement of distance is within a threshold.

7. The apparatus for controlling the activation of a safety restraint actuator responsive to an object that is subject to restraint by the safety restraint actuator, as recited in claim 6, further comprising a warning device operatively coupled to said controller so as to indicate when said measurement of distance is within a threshold.

8. The apparatus for controlling the activation of a safety restraint actuator responsive to an object that is subject to restraint by the safety restraint actuator, as recited in claim 1, wherein said position sensor further comprises a second electrode incorporated into a distal portion of the safety restraint actuator, whereby said second electrode is distinct from said first electrode.

9. The apparatus for controlling the activation of a safety restraint actuator responsive to an object that is subject to restraint by the safety restraint actuator, as recited in claim 8, wherein said position sensor further comprises
   a. a means for producing an electric field between said first and second electrodes; and
   b. a means for sensing the influence of the object on said electric field.

10. The apparatus for controlling the activation of a safety restraint actuator responsive to an object that is subject to restraint by the safety restraint actuator, as recited in claim 9, wherein said controller inhibits the activation of the safety restraint actuator if said measurement of distance is within a threshold.

11. The apparatus for controlling the activation of a safety restraint actuator responsive to an object that is subject to restraint by the safety restraint actuator, as recited in claim 10, further comprising a warning device operatively coupled to said controller so as to indicate when said measurement of distance is within a threshold.

12. The apparatus for controlling the activation of a safety restraint actuator responsive to an object that is subject to restraint by the safety restraint actuator, as recited in claim 8, wherein said position sensor further comprises a means for measuring the capacitance of said first and second electrodes.

13. The apparatus for controlling the activation of a safety restraint actuator responsive to an object that is subject to restraint by the safety restraint actuator, as recited in claim 12, wherein said controller inhibits the activation of the safety restraint actuator if said measurement of distance is within a threshold.

14. The apparatus for controlling the activation of a safety restraint actuator responsive to an object that is subject to restraint by the safety restraint actuator, as recited in claim 13, further comprising a warning device operatively coupled to said controller so as to indicate when said measurement of distance is within a threshold.

15. The apparatus for controlling the activation of a safety restraint actuator responsive to an object that is subject to restraint by the safety restraint actuator, as recited in claim 1, wherein said position sensor further comprises a second electrode incorporated into the surroundings of the safety restraint actuator.

16. The apparatus for controlling the activation of a safety restraint actuator responsive to an object that is subject to restraint by the safety restraint actuator, as recited in claim 15, wherein said position sensor further comprises:
   a. a means for producing an electric field between said first and second electrodes; and
   b. a means for sensing the influence of the object on said electric field.

17. The apparatus for controlling the activation of a safety restraint actuator responsive to an object that is subject to restraint by the safety restraint actuator, as recited in claim 16, wherein said controller inhibits the activation of the safety restraint actuator if said measurement of distance is within a threshold.

18. The apparatus for controlling the activation of a safety restraint actuator responsive to an object that is subject to restraint by the safety restraint actuator, as recited in claim 17, further comprising a warning device operatively coupled to said controller so as to indicate when said measurement of distance is within a threshold.

19. The apparatus for controlling the activation of a safety restraint actuator responsive to an object that is subject to restraint by the safety restraint actuator, as recited in claim 15, wherein said position sensor further comprises a means for measuring the capacitance of said first and second electrodes.

20. The apparatus for controlling the activation of a safety restraint actuator responsive to an object that is subject to restraint by the safety restraint actuator, as recited in claim 19, wherein said controller inhibits the activation of the safety restraint actuator if said measurement of distance is within a threshold.

21. The apparatus for controlling the activation of a safety restraint actuator responsive to an object that is subject to restraint by the safety restraint actuator, as recited in claim 20, further comprising a warning device operatively coupled to said controller so as to indicate when said measurement of distance is within a threshold.

22. A method of controlling the activation of a safety restraint actuator responsive to an object that is subject to restraint by the safety restraint actuator, comprising the steps of:
   a. creating an electric field proximate a distal portion of the safety restraint actuator;
   b. measuring the distance between a point of reference and the object from the influence of the object on said electric field.

23. The method of controlling the activation of a safety restraint actuator responsive to an object that is subject to restraint by the safety restraint actuator, as recited in claim 22, further comprising the step of inhibiting the activation of the safety restraint actuator if said measurement of distance is within a threshold.

24. The method of controlling the activation of a safety restraint actuator responsive to an object that is subject to restraint by the safety restraint actuator, as recited in claim 22, further comprising the step of activating a warning device if said measurement of distance is within a threshold.

25. The method of controlling the activation of a safety restraint actuator responsive to an object that is subject to restraint by the safety restraint actuator, as recited in claim 23, further comprising the step of activating a warning device if said measurement of distance is within a threshold.

26. The method of controlling the activation of a safety restraint actuator responsive to an object that is subject to restraint by the safety restraint actuator, as recited in claim 22, wherein said electric field is created between a plurality of electrodes incorporated into a distal portion of the safety restraint actuator.

27. The method of controlling the activation of a safety restraint actuator responsive to an object that is subject to restraint by the safety restraint actuator, as recited in claim 26, further comprising the step of inhibiting the activation of the safety restraint actuator if said measurement of distance is within a threshold.

28. The method of controlling the activation of a safety restraint actuator responsive to an object that is subject to restraint by the safety restraint actuator, as recited in claim 26, further comprising the step of activating a warning device if said measurement of distance is within a threshold.

29. The method of controlling the activation of a safety restraint actuator responsive to an object that is subject to restraint by the safety restraint actuator, as recited in claim 27, further comprising the step of activating a warning device if said measurement of distance is within a threshold.

30. The method of controlling the activation of a safety restraint actuator responsive to an object that is subject to restraint by the safety restraint actuator, as recited in claim 22, wherein said electric field is created between an electrode incorporated into a distal portion of the safety restraint actuator and one or more electrodes incorporated into the surroundings of the safety restraint actuator.

31. The method of controlling the activation of a safety restraint actuator responsive to an object that is subject to restraint by the safety restraint actuator, as recited in claim 30, further comprising the step of inhibiting the activation of the safety restraint actuator if said measurement of distance is within a threshold.

32. The method of controlling the activation of a safety restraint actuator responsive to an object that is subject to restraint by the safety restraint actuator, as recited in claim 30, further comprising the step of activating a warning device if said measurement of distance is within a threshold.

33. The method of controlling the activation of a safety restraint actuator responsive to an object that is subject to restraint by the safety restraint actuator, as recited in claim 31, further comprising the step of activating a warning device if said measurement of distance is within a threshold.

34. A method of controlling the activation of a safety restraint actuator responsive to an object that is subject to restraint by the safety restraint actuator comprising the steps of:
   a. Sensing the capacitance of an electrode incorporated into a distal portion of the safety restraint actuator;
   b. measuring the distance between a point of reference and the object from the level of said capacitance.

35. The method of controlling the activation of a safety restraint actuator responsive to an object that is subject to restraint by the safety restraint actuator, as recited in claim 34, further comprising the step of inhibiting the activation of the safety restraint actuator if said measurement of distance is within a threshold.

36. The method of controlling the activation of a safety restraint actuator responsive to an object that is subject to restraint by the safety restraint actuator, as recited in claim 34, further comprising the step of activating a warning device if said measurement of distance is within a threshold.

37. The method of controlling the activation of a safety restraint actuator responsive to an object that is subject to restraint by the safety restraint actuator, as recited in claim 35, further comprising the step of activating a warning device if said measurement of distance is within a threshold.

38. The method of controlling the activation of a safety restraint actuator responsive to an object that is subject to restraint by the safety restraint actuator, as recited in claim 34, wherein said capacitance is created by a plurality of electrodes incorporated into a distal portion of the safety restraint actuator.

39. The method of controlling the activation of a safety restraint actuator responsive to an object that is subject to restraint by the safety restraint actuator, as recited in claim 38, further comprising the step of inhibiting the activation of the safety restraint actuator if said measurement of distance is within a threshold.

40. The method of controlling the activation of a safety restraint actuator responsive to an object that is subject to restraint by the safety restraint actuator, as recited in claim 38, further comprising the step of activating a warning device if said measurement of distance is within a threshold.

41. The method of controlling the activation of a safety restraint actuator responsive to an object that is subject to restraint by the safety restraint actuator, as recited in claim 39, further comprising the step of activating a warning device if said measurement of distance is within a threshold.

42. The method of controlling the activation of a safety restraint actuator responsive to an object that is subject to restraint by the safety restraint actuator, as recited in claim 34, wherein said capacitance is created by plurality of electrodes at least one of which is incorporated into a distal portion of the safety restraint actuator.

43. The method of controlling the activation of a safety restraint actuator responsive to an object that is subject to restraint by the safety restraint actuator, as recited in claim 42, further comprising the step of inhibiting the activation of the safety restraint actuator if said measurement of distance is within a threshold.

44. The method of controlling the activation of a safety restraint actuator responsive to an object that is subject to restraint by the safety restraint actuator, as recited in claim 42, further comprising the step of activating a warning device if said measurement of distance is within a threshold.

45. The method of controlling the activation of a safety restraint actuator responsive to an object that is subject to restraint by the safety restraint actuator, as recited in claim 43, further comprising the step of activating a warning device if said measurement of distance is within a threshold.

* * * * *